Dec. 10, 1963 P. DOTTER 3,113,812
ANTI-FRICTION BEARING
Filed Dec. 21, 1961 2 Sheets-Sheet 1

INVENTOR
Paul Dotter

Dec. 10, 1963 P. DOTTER 3,113,812
ANTI-FRICTION BEARING

Filed Dec. 21, 1961 2 Sheets-Sheet 2

INVENTOR
*Paul Dotter*

United States Patent Office 3,113,812
Patented Dec. 10, 1963

3,113,812
ANTI-FRICTION BEARING
Paul Dotter, Schweinfurt (Main), Germany, assignor to Fichtel & Sachs A.G., Schweinfurt (Main), Germany, a corporation of Germany
Filed Dec. 21, 1961, Ser. No. 161,228
Claims priority, application Germany Dec. 31, 1960
2 Claims. (Cl. 308—187.1)

This invention relates to anti-friction bearings, and more particularly to anti-friction bearings for bicycle or motorcycle hubs and the like.

Bicycle and motorcycle hubs generally are equipped with ball bearings having at least one conical race. Such conical ball bearings are capable of absorbing axial loads. They are also readily adjusted for proper bearing play after completion of manufacturing steps and during use to compensate for wear and the like.

It has been found difficult to protect such bearings against external contaminants, such as water or road dust, and against loss of lubricant by leakage. The latter problem is particularly serious in hubs equipped with internal brakes. The temperature of the hub is increased by the brake friction, and the viscosity of the lubricant is reduced by heating.

It has been conventional to employ mechanical seals for such hubs, but mechanical seals cannot entirely prevent lubricant losses. Felt washers also have been widely used, but they are relatively short-lived. Rubber is a conventional packing material in motor cars, but it causes more friction than is permissible in a bicycle and in many motorcycles. Rubber packings also are of undesirably great size.

The object of this invention is the provision of a suitable sealing arrangement for an anti-friction bearing of the type employed in bicycle hubs and the like which is free of the above-indicated short-comings of conventional sealing arrangements.

It is necessary that the sealing arrangement should not interfere with disassembly and reassembly of the bearing, and that individual anti-friction elements such as the balls of the usual conical hub bearings be replaceable if worn, and reusable if other structural parts of the bearing require replacement.

An important object of the invention is the provision of a sealing arrangement for a bearing of the type described which is light in weight and occupies but a minimum of space.

Another object is the provision of a sealing arrangement which is simple and sturdy, and capable of being manufactured at the low cost necessary in bicycle parts.

Yet another object is the provision of a sealing arrangement which is durable, not readily worn down, and not prone to constitute a source of vibrations which would shorten the useful life of other parts of the bearing.

With these and other objects in view, the invention mainly resides in a sealing member which is fixedly fastened to the cage member of the bearing which is to be sealed. The sealing member is located in the annular gap between the outer and inner bearing races which also holds the anti-friction elements of the bearing, such as bearing balls. The preferred material for the sealing member of the invention is a plastic, the term being employed in the usual manner to designate a synthetic polymeric organic material.

The exact nature of this invention as well as other objects and advantages thereof will be readily apparent from consideration of the following specification relating to the annexed drawing in which.

Figure 1:
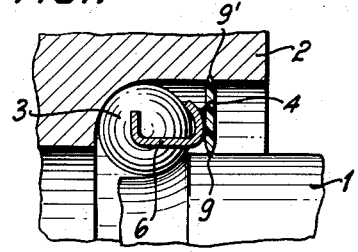
FIG. 1 shows a detail of a bicycle hub in side-elevational section through the hub axis to reveal portions of a ball bearing according to this invention.
Figure 4:
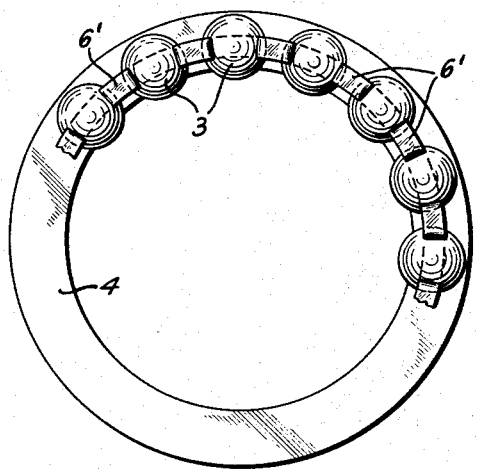
FIG. 4 shows elements of the ball bearing of FIG. 1 in front elevation, with a part shown to be, however, of another material than in FIG. 1.

Referring now to the drawing and initially to FIG. 1, there is seen the tapered inner race 1 of a bicycle hub bearing. The inner race 1 is assembled with an outer race 2 and with interposed bearing balls 3 in such a manner that the assembly may readily be taken apart for cleaning, lubrication or the like as is well known. While only one bearing ball is seen in FIG. 1, a multiplicity of balls is arranged about the hub axis in the annular gap between the two races 1, 2, for rolling contact therewith. The relative circumferential position of the balls 3 is fixed by a cage member 6 seen in more detail in FIGS. 4 and 5.

The cage member 6 consists of as many bight portions 10 as there are bearing balls to be held. Each two adjacent bight portions are connected by a leg portion 61, as can best be seen in FIG. 5. The cage member 6 made of a strip of material may receive the bearing balls 3 or release them when not confined between the inner and outer races 1, 2.

A flat annular disc 4 is adhesively secured to the cage member 6, the adhesive joint being formed with the several bight portions 10 of the cage member in points of a plane that is commonly tangent to the bight portions. The dimensions of the disc 4 and its spatial relationship to the cage member 6 is such that upon insertion of the cage member with the disc 4 in the bearing pan, the disc 4 substantially seals the gap between the races 1, 2. As shown in FIG. 1, the surfaces of the races are grooved to receive the outer and inner circular edges of the disc 4 respectively. Since the races 1 and 2 rotate relative to each other during operation of the bearing, it is necessary that the dics 4 have sufficient clearance in at least one of the grooves 9, 9' of the bearing races to permit free rotary movement of the disc relative to the respective race.

In the embodiment illustrated in FIG. 1, the cage member 6 is of metal, and the disc 4 is of nylon plastic. The choice of the adhesive depends on the nature of the metal employed, and those skilled in the art are familiar with suitable adhesives.

Figure 2:
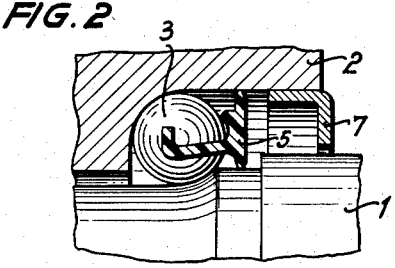
FIG. 2 illustrates a modified ball bearing of the invention in a view corresponding to that of FIG. 1.

The ball bearing partly illustrated in FIG. 2 differs from the afore-described bearing by the provision of a unitary ring 5 which combines the shapes and functions of the cage member 6 and the disc 4. The ring 5 extends from the inner bearing race 1 to the outer bearing race 2 to substantially close the gap between the races. While grooves similar to grooves 9, 9' in FIG. 1 have not been shown in FIG. 2, it will be appreciated that the bearing races may be equipped with such grooves to hold the ring 5 in position if so desired.

The ring 5 is equipped with axial projections identical in contour with the leg portions 6' of the member 6 to provide spacers between adjacent bearing balls 3. The shape of the ring 5 differs from the showing of FIG. 5 by the fact that the projections which partly envelope the bearing balls 3 are solid and form seats for the balls, whereas adjacent bight portions of the cage member 6 are spaced from each other so as to define hour-glass shaped passages therewith. These passages appear filled with plastic material, as far as the ring 5 is concerned, to facilitate the manufacture of the ring on conventional plastic molding equipment.

The bearing is protected against coarse contaminant particles and against mechanical damage to the plastic ring 5 by an annular metal cover 7 of L-shaped cross section.

Figure 5:
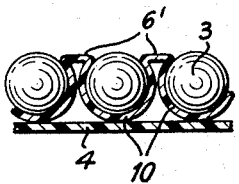
FIG. 5 shows the bearing elements of FIG. 4, in fragmentary plan view.

The bight portions 10 each of which has a root open, as can best be seen from FIG. 5, away from the roots and away from one side of the gap and thereby form circumferential part supports for the bearing balls 3. No part of the cage member extends beyond the bearing balls toward the other side of the gap.

Figure 3:
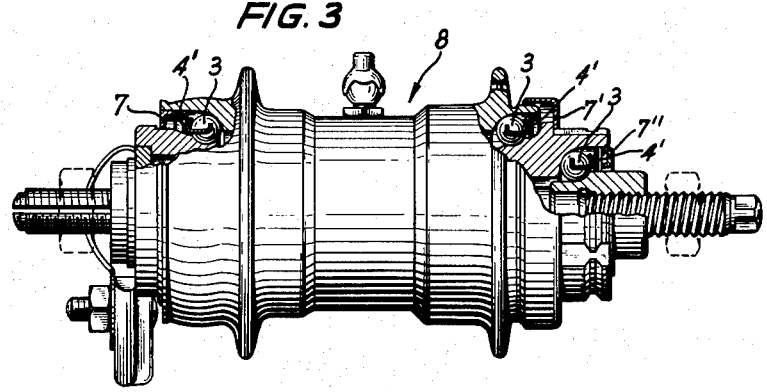
FIG. 3 is a side-elevational view of a bicycle wheel hub, portions of the hub being broken away to show the anti-friction bearings mounted therein.

The location at which the sealed bearings of the invention may be employed in a bicycle hub are illustrated in FIG. 3. The hub 8 of conventional shape and generally metallic material is partly broken away to reveal three ball bearings, each having a plurality of balls, only one ball being visible in each bearing. The balls are retained in rings 4' of substantially the same shape, although somewhat different in size, and each consisting of a unitary plastic molding which functions both as a ball cage and as a seal. The plastic rings 4' are protected against mechanical injury by annular metal covers 7, 7', 7" suitably shaped to fit over respective portions of the hub 8.

While ball bearings of the type employed in bicycles have been illustrated and described, this invention is not limited to bicycles, nor to ball bearings as such. It is evident that any bearing having anti-friction elements restrained in a cage substantially as shown, may be equipped with a seal of the invention without appreciable increase in weight, space requirements, or cost. The position of the sealing member is closely defined by its cooperation with the anti-friction elements, and wear of the sealing member itself is thereby held to a minimum. The sealing member makes contact with the bearing races, if at all, under a minimum of pressure. Friction thus is very low, and the sealing qualities of the arrangement are maintained over extended periods of operation to keep contaminants from the bearing, and hold the lubricant in it.

Making the sealing member of plastic not only reduces the first cost of the sealing arrangement, but has been found to give substantially improved wear characteristics to the seal formed. If it becomes necessary to replace the sealing member, the hub is as readily disassembled as it would be if the seal had not been provided. The individual bearing balls may be removed from the cage member and re-used in a substitute cage-and-seal unit, whether the unit be integral or adhesively assembled from a metal cage and a plastic sealing member.

The cage of the bearing arrangement of the invention has been found not to vibrate, or to vibrate at a much smaller amplitude than an otherwise identical cage not equipped with a fixedly fastened or integral sealing member. Since vibration of the bearing cage is a well recognized source of bearing wear in bicycle hubs and the like, the bearings equipped with the sealing arrangement of the invention are unusually durable.

It should be understood, of course, that the foregoing disclosure relates to only preferred embodiments of the invention and that numerous modifications or alterations may be made therein without departing from the spirit and scope of the invention set forth in the appended claims.

What is claimed is:
1. An anti-friction bearing comprising
   (a) outer race means,
   (b) inner race means defining together with said outer race means an annular gap,
   (c) a plurality of anti-friction elements in said gap in simultaneous rolling contact with said outer and inner race means,
   (d) cage means constituted by a series of spacedly arranged consecutive bight portions, said bight portions having roots and opening away from said roots and from one side of said gap to partly envelope and circumferentially support said elements one by one without extending beyond said elements, said bight portions being arranged to be touched on said gap side by a common tangential plane, and
   (e) sealing means of plastic synthetic polymeric material, said sealing means extending from said outer race means to said inner race means on said gap side and being adhesively fastened to said cage means in points of said common tangential plane, said sealing means substantially sealing said gap.

2. In a hub for a bicycle and the like,
   (a) an outer race member having an axis,
   (b) an inner race member coaxial with said outer race member and defining therewith an axially open annular gap about said axis,
   (c) a plurality of anti-friction elements in said gap in simultaneous rolling contact with said members,
   (d) a bearing cage being constituted by a strip of material forming series of alternating bight portions and leg portions, each of said leg portions spacing adjacent bight portions, said bight portions having roots and opening away from said roots and from one side of said gap to partly envelop and circumferentially support said elements one by one without extending beyond said elements, said bight portions being arranged to be touched on said gap side by a common tangential plane, and
   (e) a sealing member of plastic synthetic polymeric material, said sealing member having substantially the shape of an annular disc and extending from said outer race member to said inner race member on said gap side and substantially perpendicularly to said axis, said sealing member being adhesively fastened to said roots in points of said common tangential plane, said sealing member substantially sealing said gap.

References Cited in the file of this patent

UNITED STATES PATENTS

| | | |
|---|---|---|
| 1,530,086 | Lontz | Mar. 17, 1925 |
| 1,981,399 | Thomson | Nov. 20, 1934 |
| 2,755,515 | Cotchett | July 24, 1956 |
| 2,809,130 | Rappaport | Oct. 8, 1957 |
| 2,856,243 | Stellwag | Oct. 14, 1958 |

FOREIGN PATENTS

| | | |
|---|---|---|
| 615,107 | Great Britain | Jan. 3, 1949 |
| 1,104,870 | France | June 22, 1955 |
| 1,030,629 | Germany | May 22, 1958 |
| 833,847 | Great Britain | May 4, 1960 |